United States Patent
Wang et al.

(10) Patent No.: US 11,687,960 B2
(45) Date of Patent: Jun. 27, 2023

(54) ANALYZING CROP FIELDS BASED ON AGRICULTURAL MANAGEMENT PRACTICES

(71) Applicant: Mineral Earth Sciences LLC, Mountain View, CA (US)

(72) Inventors: Nanzhu Wang, San Jose, CA (US); Chunfeng Wen, Santa Clara, CA (US); Yueqi Li, San Jose, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 0 days.

(21) Appl. No.: 17/689,218

(22) Filed: Mar. 8, 2022

(65) Prior Publication Data

US 2022/0188854 A1 Jun. 16, 2022

Related U.S. Application Data

(63) Continuation of application No. 16/918,668, filed on Jul. 1, 2020, now Pat. No. 11,295,331.

(51) Int. Cl.
*G06Q 10/00* (2023.01)
*G06Q 30/0201* (2023.01)
(Continued)

(52) U.S. Cl.
CPC ....... *G06Q 30/0206* (2013.01); *A01B 79/005* (2013.01); *G06F 16/29* (2019.01);
(Continued)

(58) Field of Classification Search
None
See application file for complete search history.

(56) References Cited

U.S. PATENT DOCUMENTS

| 10,936,871 | B2* | 3/2021 | Tran | H04L 9/3239 |
| 2010/0036696 | A1* | 2/2010 | Lang | A01B 79/005 |
| | | | | 702/182 |

(Continued)

OTHER PUBLICATIONS

Rim, Elijah, Successful Farming: Top Agricultural Software, Nov. 13, 2019, EOS Data Analytics, https://eos.com/blog/farm-management-software-is-a-key-to-successful-farming/, p. 1-47. (Year: 2019).*

(Continued)

*Primary Examiner* — Joseph M Waesco
(74) *Attorney, Agent, or Firm* — Gray Ice Higdon (57) ABSTRACT

Implementations are described herein for using machine learning to determine whether candidate crop fields are suitable for management by particular agricultural entities. In various implementations, a machine learning model may be applied to input data to generate output data. The input data may include a first plurality of data points corresponding to field-level agricultural management practices of an agricultural entity. The output data may be indicative of one or more predicted outcomes of the agricultural entity implementing the field-level agricultural management practices on one or more candidate crop fields not currently managed by the agricultural entity. Based on one or more of the predicted outcomes, one or more computing devices may be caused to provide a user associated with the agricultural entity with information about one or more of the candidate crop fields, and/or one or more parameter inputs of a graphical user interface may be prepopulated.

18 Claims, 7 Drawing Sheets

(51) Int. Cl.
    *G06Q 10/04*     (2023.01)
    *G06N 20/00*     (2019.01)
    *G06F 16/29*     (2019.01)
    *A01B 79/00*     (2006.01)
    *G06Q 10/0631*     (2023.01)

(52) U.S. Cl.
    CPC ............ *G06N 20/00* (2019.01); *G06Q 10/04* (2013.01); *G06Q 10/06315* (2013.01)

(56) References Cited

U.S. PATENT DOCUMENTS

| | | | |
|---|---|---|---|
| 2016/0308954 A1* | 10/2016 | Wilbur | H04L 67/52 |
| 2017/0257426 A1* | 9/2017 | Wilbur | H04L 67/12 |
| 2017/0357029 A1* | 12/2017 | Lakshmanan | G06Q 10/04 |
| 2018/0070527 A1* | 3/2018 | Richt | G06Q 10/04 |
| 2018/0211156 A1* | 7/2018 | Guan | G06N 3/0454 |
| 2019/0050948 A1* | 2/2019 | Perry | G06V 20/188 |
| 2019/0325390 A1* | 10/2019 | Perry | G05D 1/0214 |
| 2019/0325466 A1* | 10/2019 | Perry | G06F 3/0482 |
| 2019/0357425 A1* | 11/2019 | Dharna | G06Q 50/02 |
| 2020/0005401 A1* | 1/2020 | Bull | G06Q 10/06315 |
| 2020/0077574 A1* | 3/2020 | Bull | G06Q 10/06315 |
| 2020/0097851 A1* | 3/2020 | Alvarez | G05B 13/0265 |
| 2020/0134485 A1* | 4/2020 | Sood | G06N 20/00 |
| 2020/0163272 A1* | 5/2020 | White | G06Q 10/0639 |
| 2020/0184214 A1* | 6/2020 | Casas | G06V 20/188 |
| 2020/0202127 A1* | 6/2020 | Chen | G06V 20/13 |
| 2020/0242754 A1* | 7/2020 | Peters | G06Q 50/02 |
| 2020/0273172 A1* | 8/2020 | Weldemariam | G06N 3/08 |
| 2020/0302555 A1* | 9/2020 | Stacey | G01W 1/10 |
| 2020/0302556 A1* | 9/2020 | Stacey | G06Q 50/02 |
| 2020/0302557 A1* | 9/2020 | Stacey | G06N 20/20 |
| 2021/0133443 A1* | 5/2021 | Gurzoni, Jr. | G06V 20/17 |
| 2021/0208307 A1* | 7/2021 | Hill | G01W 1/10 |
| 2021/0209269 A1* | 7/2021 | Sauder | A01D 34/008 |
| 2021/0209490 A1* | 7/2021 | Casas | G06N 20/00 |
| 2021/0224927 A1* | 7/2021 | Perry | A01B 79/02 |
| 2022/0188854 A1* | 6/2022 | Wang | A01B 79/005 |

OTHER PUBLICATIONS

Er, Emrah; Applications of Machine Learning to Agricultural Land Values: Prediction and Causal Inference; An Abstract of a Dissertation; 97 pages; dated 2018.

Prassad, S. K et al.; Crop Monitoring and Recommendation System Using Machine Learning Techniques; A Project Report; 67 pages; dated Apr. 2017.

Baldominos, A. et al; Identifying Real Estate Opportunities Using Machine Learning; Applied Sciences; 24 pages; dated Nov. 21, 2018.

Stein, S. et al.; Linking Arable Crop Occurrence with Site Conditions by the Use of Highly Resolved Spatial Data; Land; 14 pages; dated 2019.

Sciforce; Machine Learning in Agriculture: Applications and Techniques; 13 pages; dated Mar. 22, 2019.

Lundhick, C.; Operator and Filed Worker Occupational Exposure Databases and Modeling; ScienceDirect; https://www.sciencedirect.com/agricultural-and-biologiacal-sciences/field-crops; pp. 1-10; dated 2010.

* cited by examiner

ANALYZING CROP FIELDS BASED ON AGRICULTURAL MANAGEMENT PRACTICES

BACKGROUND

Agricultural entities such as individual farmers, agricultural cooperatives, and agricultural companies may periodically seek out new farmland in which to grow additional crops. Determining whether a particular crop field is a good candidate for expansion (e.g., acquisition, leasing, etc.) can be a complicated question. There may be countless crop fields available, each with its own unique characteristics and/or history of stewardship. Moreover, a particular crop field's suitability to grow a particular variety of a crop—which may be manifested as an expected crop yield in some cases—is dependent on myriad factors. These factors may include, but not limited to, climate, soil composition, prevalence of plant disease (e.g., pests, fungus) and/or weeds in the area, and so forth.

Factors that contribute to a crop field's yield may also include attributes of agricultural management practices implemented in the crop field, e.g., historically and/or currently. Put another way, the crop field may or may not be compatible with the agricultural entity's management practices. These agricultural management practices may include, but are not limited to, crop rotation, tillage, crop type selection, irrigation application, fertilization application, pesticide application, fungicide application, and/or herbicide application, to name a few. Thus, the process of searching for new crop fields that are likely to generate worthwhile crop yields can be daunting to say the least. Moreover, not every agricultural entity implements the same agricultural management practices, and therefore, not every agricultural entity should expect the same outcome for a given crop field.

SUMMARY

Implementations are described herein for using machine learning to determine whether candidate crop fields are suitable for management by particular agricultural entities. In various implementations, this determination may be based at least in part by applying a machine learning model to field-level agricultural management practices of the agricultural entity. The determination may additionally or alternatively be based on applying the machine learning model to other data points associated with the agricultural entity, such as geometric or geographic information about one or more crop fields currently controlled by the agricultural entity, crop yield data corresponding to one or more crop fields currently controlled by the agricultural entity, and so forth.

The determination of whether candidate crop fields are suitable for management by particular agricultural entities may be further based on data points corresponding to candidate crop field(s) not currently under control of the agricultural entity, but that are under (or are at least eligible for) consideration for expansion by the agricultural entity. In some implementations, these data points corresponding to the candidate crop field(s) may include the same or similar field-level agricultural management practices implemented by other agricultural entities on the candidate crop field(s). Additionally or alternatively, these data points correspond to the candidate crop field(s) may include other data such as climate data, soil composition data, plant disease data, weed data, observed crop yield, predicted crop yield, and so forth.

In some implementations, machine learning-based clustering may be used to determine whether an agricultural entity is a good fit for a particular candidate crop field. This clustering may be based on various data points described above. As one example, field-level agricultural management practices implemented by an agricultural entity may be used to cluster crop-fields it controls with other candidate crop fields for which similar field-level agricultural management practices were implemented. In some such implementations, this clustering may be performed by using a machine learning model to generate an embedding of the crop field(s) controlled by the agricultural entity in embedding space, and by identifying other nearby embeddings in the embedding space. In some implementations, candidate crop fields may be further selected from the cluster based on those crop field(s) having observed yields that satisfy some threshold. Alternatively, in some implementations, the clustering may be performed further based on crop yield, so that crop fields with both similar field-level agricultural management practices and crop yields are grouped together into clusters.

Additionally or alternatively, in some implementations, input data points associated with both the agricultural entity (e.g., its own field-level agricultural management practices) and the candidate crop field(s) under consideration may be applied as input to a machine learning model to generate predicted outcome(s) should the agricultural entity take control of the candidate crop field. These predicted outcomes may include, for instance, a crop yield prediction, a measure of achieved field management efficiency, a profit margin prediction, and so forth.

In some implementations, a user such as an employee of an agricultural entity may interact with a graphical user interface ("GUI") rendered by a computing device to search candidate crop fields for those that might be suitable for potential acquisition or expansion (or other types of investment). For example, the GUI may include a map that depicts an overhead view of an agricultural region that includes a plurality of crop fields. Using techniques described herein, a subset of the plurality of crop fields shown in the map that would likely be suitable for control by the agricultural entity may be visually emphasized, annotated, configured to be interactive and/or selectable, etc.

In some implementations, the user may be presented with one or more search fields and/or filters that the user can use to provide crop field search parameters. However, as noted above, there may be myriad factors that influence whether the agricultural entity is likely to succeed in any crop field. Accordingly, there could be myriad search fields/filters that allow for the user to search based on these parameters, making the task of populating and/or adjusting these numerous values daunting and/or cumbersome. Moreover, providing the user with the ability to adjust all the myriad different factors that might contribute to a crop field's success or failure may be overwhelming and/or frustrating for the user. Accordingly, in some implementations, techniques described herein may be used to auto-populate at least some of these search fields and/or parameters so that the user doesn't have to. Because these techniques may rely on the agricultural entity's own field-level agricultural management practices, their search requests and resulting search results may in effect be personalized to the agricultural entity.

In various implementations, a method may be implemented using one or more processors and may include: applying a machine learning model to input data to generate output data, wherein the input data includes a first plurality of data points corresponding to field-level agricultural management practices of an agricultural entity, and wherein the output data is indicative of one or more predicted outcomes of the agricultural entity implementing the field-level agricultural management practices on one or more candidate crop fields not currently managed by the agricultural entity; and based on one or more of the predicted outcomes, causing one or more computing devices to provide a user associated with the agricultural entity with information about one or more of the candidate crop fields.

In various implementations, the causing may include causing one or more of the computing devices to render a graphical user interface. In various implementations, the graphical user interface may include a map that visually distinguishes one of the candidate crop fields that satisfies a criterion based on the output data from one or more others of the candidate crop fields that fail to satisfy the criterion based on the output data. In various implementations, the applying may be performed in response to receipt of input signaling that the user intends to search or is searching for candidate crop fields to be managed by the agricultural entity.

In various implementations, the information may include information about one or more of the candidate crop fields that satisfy one or more criteria. In various implementations, the one or more criteria may include a threshold distance in latent space between an embedding generated based at least in part on the field-level agricultural management practices of the agricultural entity and one or more embeddings generated based on one or more of the candidate crop fields. In various implementations, the one or more criteria may further include a crop yield threshold or a profit margin threshold.

In various implementations, the input data may further include a second plurality of data points corresponding to the one or more candidate crop fields not currently controlled by the agricultural entity. In various implementations, the second plurality of data points may include field-level agricultural management practices historically implemented on one or more of the candidate crop fields. In various implementations, the second plurality of data points may include climate data associated with one or more of the candidate crop fields.

In various implementations, the predicted outcome may include: a crop yield prediction; a measure of achieved field management efficiency; or a profit margin. In various implementations, the field-level agricultural management practices of the agricultural entity may include two or more of the following practices implemented by the agricultural entity in one or more crop fields controlled by the agricultural entity: tillage practice; crop rotation; cover crop practice; crop type selection; irrigation application; fertilization application; pesticide application; fungicide application; or herbicide application.

In various implementations, the input data may further include geometric or geographic information about one or more crop fields currently controlled by the agricultural entity. In various implementations, the input data may further include crop yield data corresponding to one or more crop fields currently controlled by the agricultural entity.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
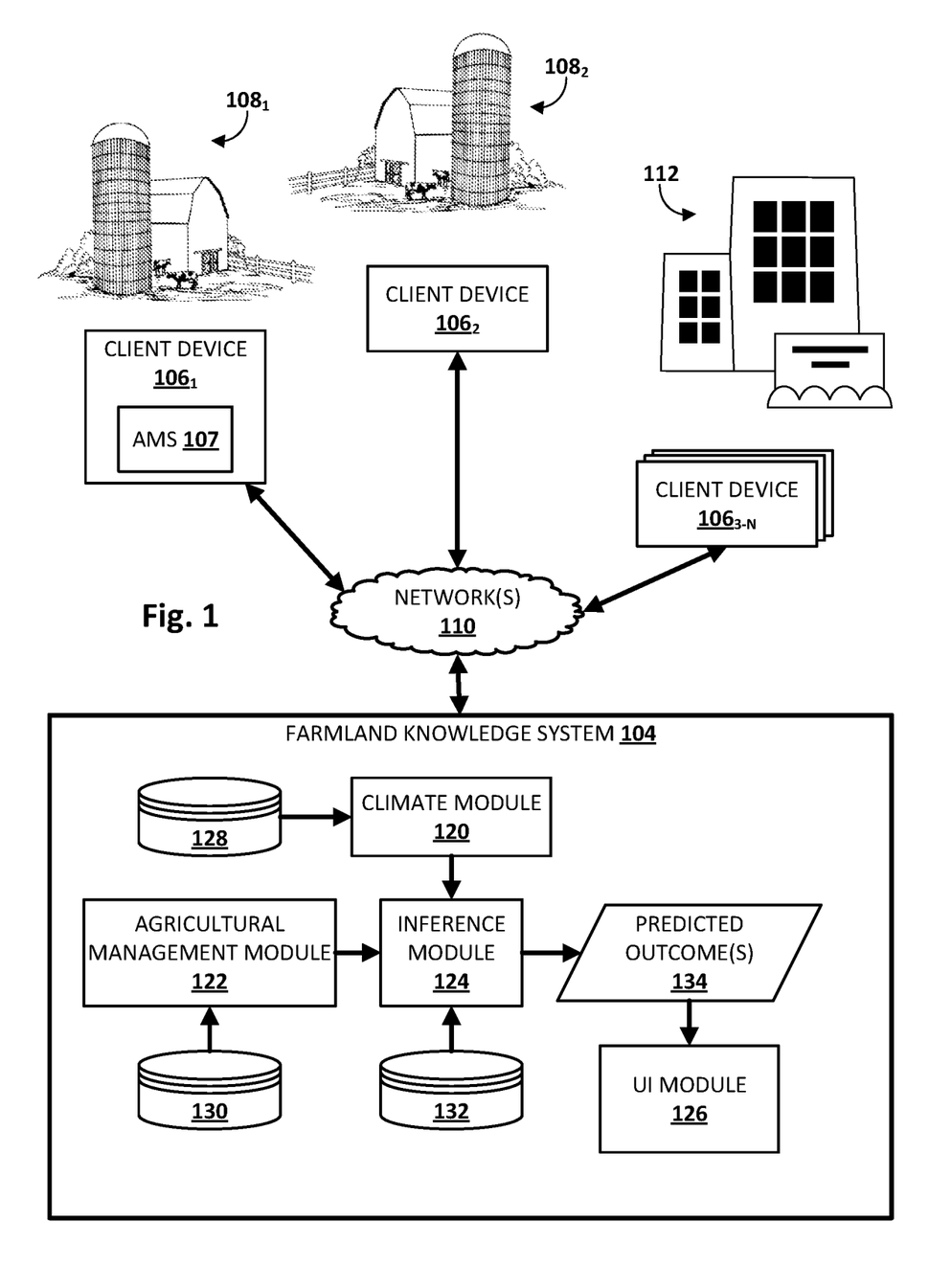
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

An individual (which in the current context may also be referred to as a "user") associated with an agricultural entity may operate one or more client devices $106_{1-N}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth.

Farmland knowledge system 104 is an example of an information system in which the techniques described herein may be implemented. Each of client devices 106 and farmland knowledge system 104 may include one or more memories for storage of data and software applications, one or more processors for accessing data and executing applications, and other components that facilitate communication over a network. The operations performed by client device 106 and/or farmland knowledge system 104 may be distributed across multiple computer systems.

In FIG. 1, first client device $106_1$ is associated with (e.g., controlled and/or maintained by) a first agricultural entity in the form of a first farm $108_1$. Similarly, a second client device $106_2$ is associated with a second agricultural entity in the form of a second farm $108_2$. One are more additional client devices $106_{3-N}$ are associated with another agricultural entity that takes the form of an organization 112 such as a commercial entity, a farming cooperative or "co-op," a governmental agency or department, etc. The environment depicted in FIG. 1, including the particular arrangement of agricultural entities and client devices that is depicted, is not meant to be limiting. Individual farms may be associated with multiple client devices, for instance.

Each client device 106 may operate a variety of different applications that may be used to perform various agricultural tasks, such as crop yield prediction and diagnosis, field searching, field-level crop management, plant-level phenotyping, etc. For example, first client device $106_1$ operates agricultural management software ("AMS") 107 (e.g., which may be standalone or part of another application, such as part of a web browser). Other client devices 106 may operate similar applications.

In various implementations, farmland knowledge system 104 may be implemented across one or more computing systems that may be referred to as the "cloud." Farmland knowledge system 104 may include various components that, alone or in combination, perform selected aspects of the present disclosure. For example, in FIG. 1, farmland knowledge system 104 includes a climate module 120, an agricultural management module 122, an inference module 124, and a user interface ("UI") module 126. One or more of these modules may be omitted and/or combined with other modules.

Farmland knowledge system 104 may also include one or more databases. In this specification, the term "database" and "index" will be used broadly to refer to any collection of data. The data of the database and/or the index does not need to be structured in any particular way and it can be stored on storage devices in one or more geographic locations.

For example, farmland knowledge system 104 may include, in communication with climate module 120, a climate database 128 for storing historical climate data associated with various agricultural areas of interest, such as whole farms, individual crop fields or plots, greenhouses, and so forth. Historical climate data may include data related to, for instance, precipitation levels/frequencies, temperatures, sunlight exposure, soil composition, wind, humidity, plant disease, and so forth. Climate module 120 may be configured to retrieve historical climate data from climate database 128, e.g., on demand when a user associated with an agricultural entity operates AMS 107 to search for suitable farmland. For example, climate module 120 may retrieve climate data for one or both of farmland currently managed by the agricultural entity and for candidate farmland that the user is analyzing or is deemed likely to analyze (e.g., is nearby to farmland currently rendered in a GUI of AMS 107). In various implementations, climate module 120 may provide at least some of this retrieved data to downstream components such as inference module 124.

Farmland knowledge system 104 may also include an agricultural management database 130 in communication with agricultural management module 122. Agricultural management database 130 may store information about how various agricultural areas of interest, such as whole farms, individual crop fields or plots, greenhouses, and so forth, are managed over time. These data may alternatively be referred to as "stewardship" data, and may include, for instance, field-level agricultural management practices of agricultural entities.

In some implementations, agricultural management data in database 130 may be organized (e.g., indexed) by agricultural entities, such that field-level agricultural management practices of a particular agricultural entity can be readily retrieved, e.g., using an identifier of the agricultural entity. Agricultural management module 122 may be configured to retrieve various data from agricultural management database 130 and provide it (e.g., in a suitable form) to downstream components such as inference module 124.

Inference module 124 may be configured to apply input data received from agricultural management module 122 and/or climate module 120 across various machine learning models stored in machine learning model database 132 to generate output data. The input data may include one or both of data corresponding to the agricultural entity that is seeking information about candidate farmland and data corresponding to the candidate farmland and/or other agricultural entities that manage the candidate farmland.

With regard to data corresponding to the inquiring agricultural entity, the input data may include, for instance, data points obtained from database 130 that correspond to field-level agricultural management practices of the agricultural entity. Field-level agricultural management practices of the agricultural entity may include, for instance, patterns and/or practices that are commonly implemented by the agricultural entity when managing crop fields, and/or results of those practices. These patterns may occur naturally (e.g., as habit) and/or may be dictated by internal policy of the agricultural entity. For example, the agricultural entity may have a policy to implement a particular crop rotation sequence in each crop field, and the crop rotation sequence may or may not include one or more cover crops. Other field-level agricultural management practices of the agricultural entity may include, for instance, irrigation practices/capabilities, fertilization practices/capabilities, pesticide practices/capabilities, fungicide practices/capabilities, herbicide practices/capabilities, plowing practices, tillage practices, etc. In some implementations, at least some field-level agricultural management practices data may include time-series data such as dates and amounts of irrigation applied, dates and amounts of fertilizer applied, etc. Results of these practices may include, for instance, crop yield, profit margin, indicators of field health such as a normalized difference vegetation index ("NVDI"), etc.

The agricultural entity's practices may also be influenced by and/or reflect an inventory of agricultural equipment and/or materials possessed/controlled by, or available to, the entity. For example, one entity may have access to airplanes or other aerial vehicles for application of materials such as fertilizer or pesticide, whereas another entity may lack these resources and instead may rely on manual labor and/or on-ground vehicles. The input data may additionally or alternatively include other information about fields currently managed by the agricultural entity, including but not limited to geometric or geographic information about one or more crop fields currently controlled by the agricultural entity, and/or crop yield data or profit margins corresponding to one or more crop fields currently controlled by the agricultural entity.

With regard to data corresponding to one or more candidate crop fields being analyzed or considered by (or on behalf of) the agricultural entity, the input data may further include data points corresponding to the one or more candidate crop fields not currently controlled by the agricultural entity. This second plurality of data points may include, for instance, field-level management practices implemented historically or currently implemented on one or more of the candidate crop fields (e.g., by current or past managing agricultural entities), climate data associated with one or more of the candidate crop fields, geometric or geographic information about one or more of the candidate crop fields, crop yield data or profit margins corresponding to one or more of the candidate crop fields, and so forth.

The output data from inference module 124 may be indicative of one or more predicted outcomes 134 of the agricultural entity if they were to implement their own field-level agricultural management practices on one or more candidate crop fields not currently managed by the agricultural entity. For example, the predicted outcomes 134 may include crop yield prediction(s), measure(s) of achieved field management efficiency, profit margin(s), etc. that the agricultural entity would likely achieve if they were to implement their field-level agricultural management practices on one or more candidate crop fields.

Various types of machine learning models may be trained to predict various outcomes as described herein, including but not limited to various types of neural networks, support vector machines, random forests, decision trees, etc. In some implementations, some or all of the input data may include time-series data. In some such implementations, the machine learning model that is employed by inference module 124 may be configured for application to time-series data, and may include, for instance, a recurrent neural network ("RNN"), a long short-term memory ("LSTM") network, a gated recurrent unit ("GRU") network, a transformer network, and so forth.

During training, data historical data associated with crop fields may be obtained, e.g., from climate module 120 and/or agricultural management module 122, and may be applied as input across the model (once or in multiple iterations if the data is time-series data) to generate output including one or more predicted outcomes. These predicted outcomes may be compared to ground truth outcomes that were achieved in the crop fields associated with the historical data. The difference(s) or error(s) between the predicted outcome(s) and the ground truth outcome(s) may be used to train the machine learning model, e.g., using techniques such as back propagation and gradient descent.

User interface ("UI") module 126 may provide an interface through which applications such as AMS 107 may interface with farmland knowledge system 104 in order to implement selected aspects of the present disclosure. As one non-limiting example, UI module 126 may generate and/or distribute scripts, executable files, and/or interactive documents written in markup languages such as hypertext markup language ("HTML") and/or extensible markup language ("XML") (e.g., "web pages"). A user associated with an agricultural entity may operate an application on a client device 106 such as a web browser (not depicted) or AMS 107 to interact with these items. By doing so, the user may be able to search farmland for candidate crop fields that are compatible with the agricultural entity's agricultural management practices. Crop fields may be "compatible" with the agricultural entity's agricultural management practices when the entity has a relatively large likelihood of being successful in managing those crop fields. Likelihood of success may be related to various predicted outcomes, such as crop yield, profit margins, overall profits, field management efficiency measurements, etc.

Based on one or more predicted outcomes, UI module 126 may cause one or more computing devices, such as one or more of client devices $106_{1-N}$, to provide a user associated with an agricultural entity with information about one or more candidate crop fields. For example, if a user is operating AMS 107 to view overhead (e.g., satellite) imagery of farmland, crop fields for which predicted outcome(s) indicate likely success for the agricultural entity may be annotated and/or highlighted for the user. By contrast, other crop fields for which predicted outcome(s) indicate that the agricultural entity is less likely to be successful may be left unannotated. As another example, suppose the user is searching on behalf of an agricultural entity for new crop fields to manage. There may be so many search parameters that the user can adjust to identify and/or analyze suitable crop fields that the user may become overwhelmed. However, by using techniques described herein, these parameters can be largely pre-populated, making the user's search task simpler.

Figure 2:
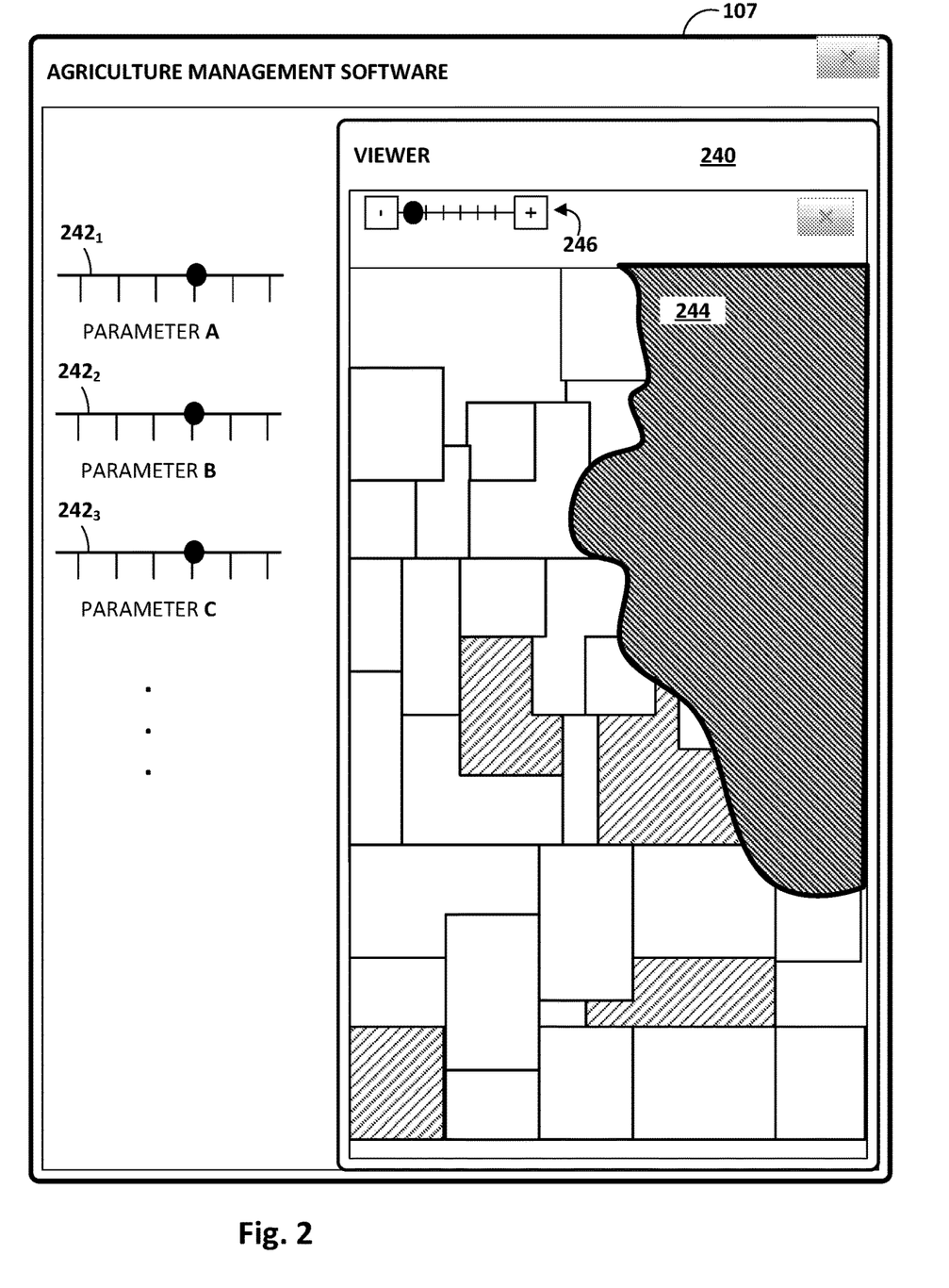
FIG. 2 schematically depicts an example graphical user interface ("GUI") that is rendered in accordance with selected aspects of the present disclosure, in accordance with various implementations.

FIG. 2 depicts one example of a GUI that may be rendered by AMS 107, in accordance with various implementations. The GUI includes a viewer 240, various parameter adjustment elements $242_{1-3}$, and a zoom adjustment element 246. Adjustment elements $242_{1-3}$ and 246 are depicted as sliders, but this is not meant to be limiting. These adjustment elements may take other forms, such as radio buttons, check boxes (e.g., to apply/remove filters), text inputs, etc. While three parameter adjustment elements $242_{1-3}$ are depicted in FIG. 2, as indicated by the ellipsis, there can be any number of parameter adjustment elements.

Viewer 240 currently is rendering an overhead view of a geographic region that includes numerous crop fields (demarcated by the rectangles of various shapes) and a body of water 244. While the crop fields are largely rectangular, this is not meant to be limiting, and crop lands can take any geometric shape, including any polygon shape, ovular, circular, triangular, etc. In FIG. 2, parameter adjustment elements $242_{1-3}$ corresponding to "Parameter A," "Parameter B," and "Parameter C" are set to particular values. Consequently, four crop fields shown in viewer 240 that satisfy these parameter settings are annotated with shading, so that the user can quickly see which crop fields satisfy their search.

Notably, at least some of the parameter settings in FIG. 2 can be populated automatically using techniques described herein. For example, field-level management practices of an agricultural entity that employs the user operating the GUI in FIG. 2 may be used to automatically populate one or more parameter values. To accomplish this, in some implementations, the field-level management practices may be used, e.g., by inference module 124, to predict which crop fields currently depicted in viewer 240 are compatible with the agricultural entity. Parameters shared amongst those crop fields may be identified (e.g., by analyzing clusters of crop fields with positive predicted outcomes) and used to automatically adjust parameter adjustment elements $242_{1-3}$ to settings that ensure that those compatible crop fields are visually emphasized, e.g., with annotations, or by being shaded as depicted in FIG. 2. Thus, the user is provided with a "bootstrapped" starting point for researching crop fields for potential management by the agricultural entity. This is particularly beneficial where there are an overwhelming number of parameters the user can choose from.

Figure 3:
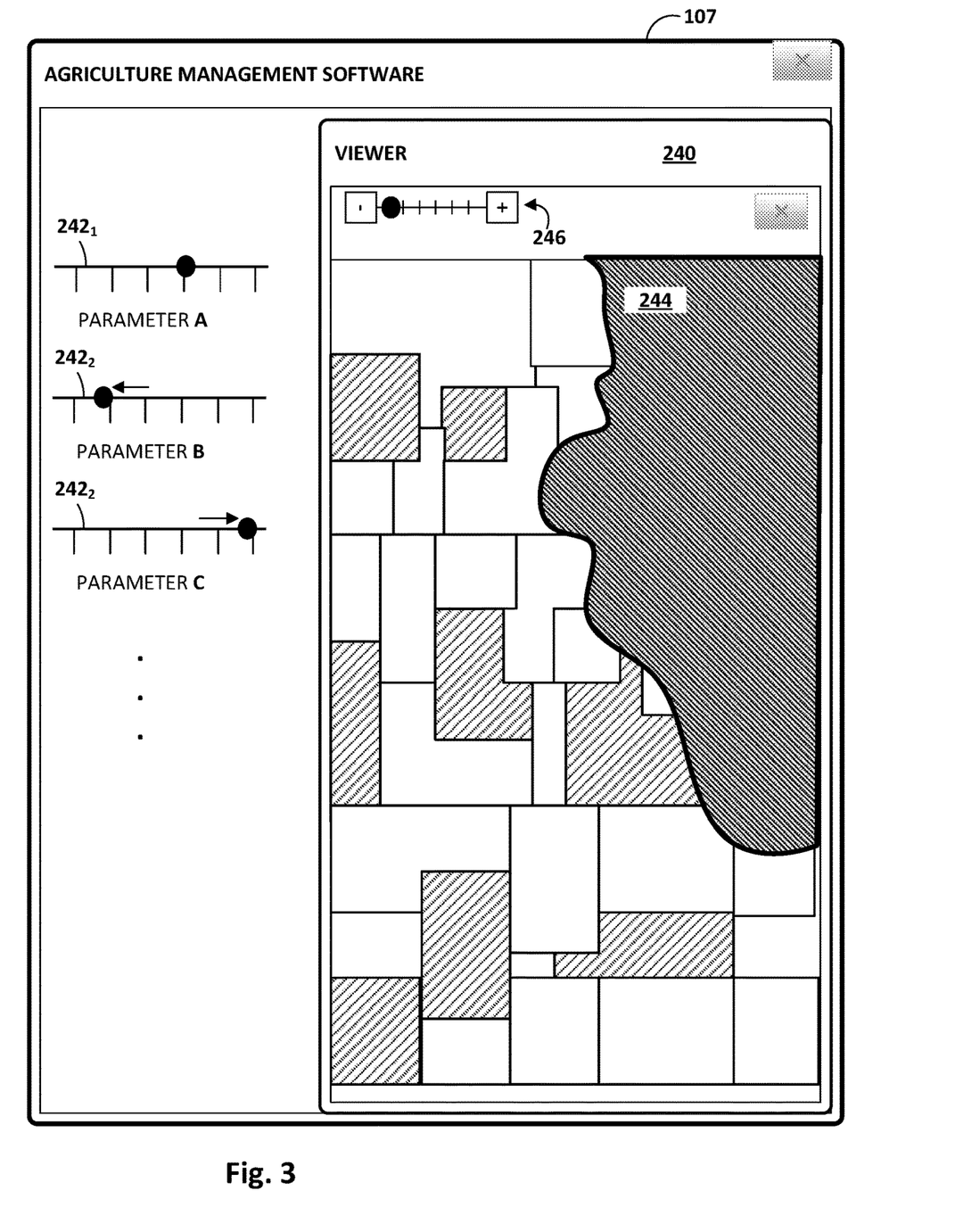
FIG. 3 schematically depicts the GUI of FIG. 2 in another state.

FIG. 3 illustrates the same GUI as FIG. 2 in a different state, and demonstrates how the user is now able to manipulate parameter adjustment elements $242_{1-3}$ to refine and/or expand the user's search. As shown by the arrows, in this example the user has decreased Parameter B ($242_2$) and increased Parameter C ($242_3$). As a result of these adjustments, more crop fields are now shaded than were in FIG. 2. Thus, the user has effectively expanded his or her search. If the user had adjusted these parameters differently than shown in FIG. 3, at least some of the four originally-shaded crop fields may have been unshaded, and/or different crop fields may have become shaded.

Figure 4:
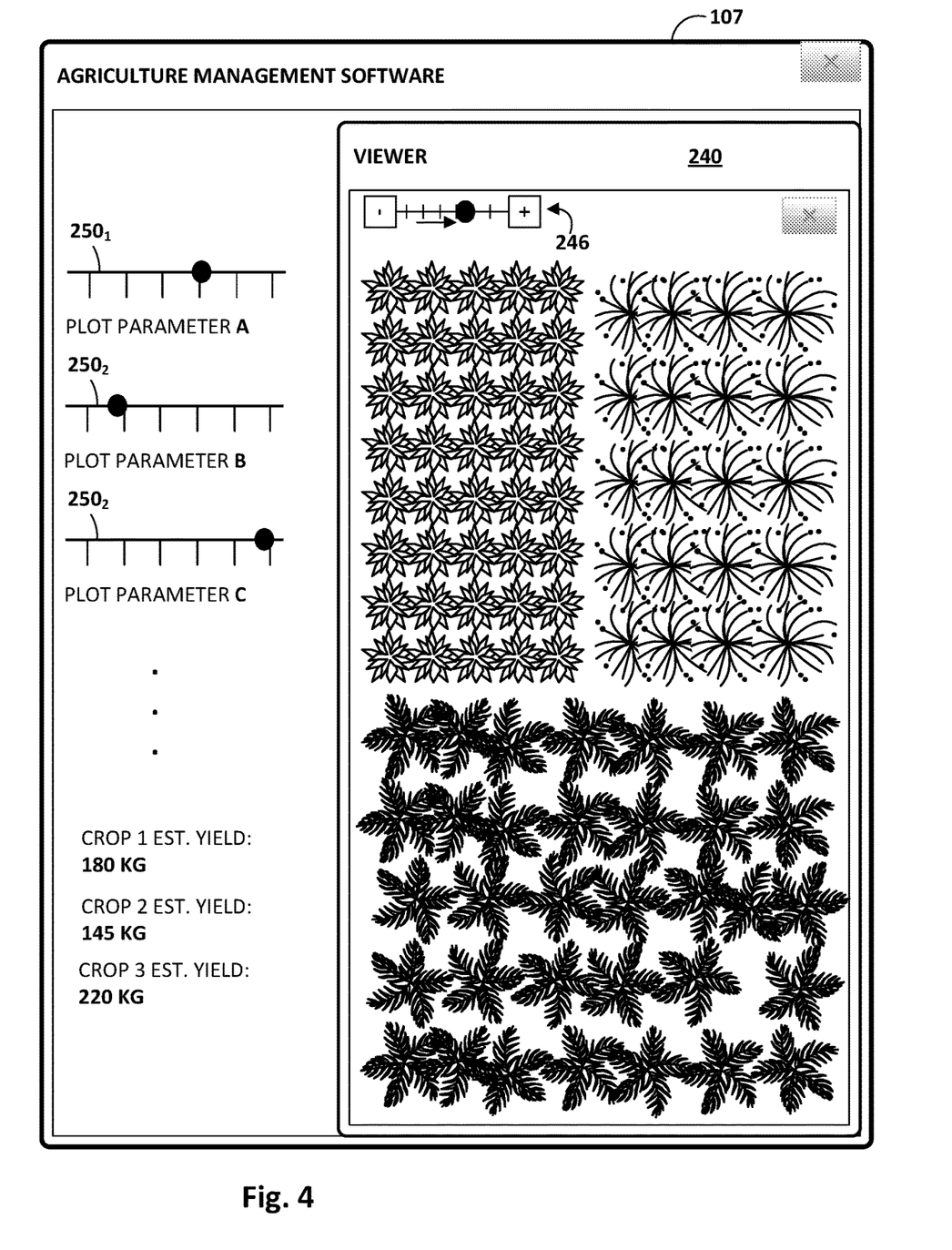
FIG. 4 schematically depicts the GUI of FIGS. 1 and 2 in yet another state.

In some implementations, AMS 107 may provide other functionality that enables a user to perform more granular analysis of individual crop fields and/or of individual corps within a crop field. For example, the user may be able to operate zoom adjustment element (slider) 246 in order to zoom viewer 240 in or out. In FIG. 4, for instance, the user has moved the zoom adjustment element (slider) 246 right, as indicated by the arrow, to zoom into a particular crop field. This crop field appears to include three different types of crops, one crop type in the top left quadrant, another crop type in the top right quadrant, and yet another crop type in the bottom half.

As a consequence of this zooming, other aspects of the GUI rendered by AMS have also changed. For example, parameter adjustment elements $242_{1-3}$, which were configured for adjusting parameters relevant to field-level searching, have been replaced with plot parameter adjustment elements $250_{1-3}$ (there may be more or less than shown in FIG. 4) that can be adjusted to, for instance, alter crop-level annotations that are shown in viewer 240. Crop-level annotations could include, for instance, text or other visual annotations indicating crop type, presence/absence of plant disease, hydration levels of crops, predicted yield, crop cycle stages, crops in need of remediation (e.g., treatment with pesticide, weeds that need to be eradicated, etc.), and so forth. Also shown at bottom left are some field-level statistics such as estimated crop yields for each of the crop types depicted in viewer 240 in FIG. 4. The zoom level in FIG. 4 may be used, e.g., by agricultural personnel to manage and/or analyze individual crop fields.

Figure 5:
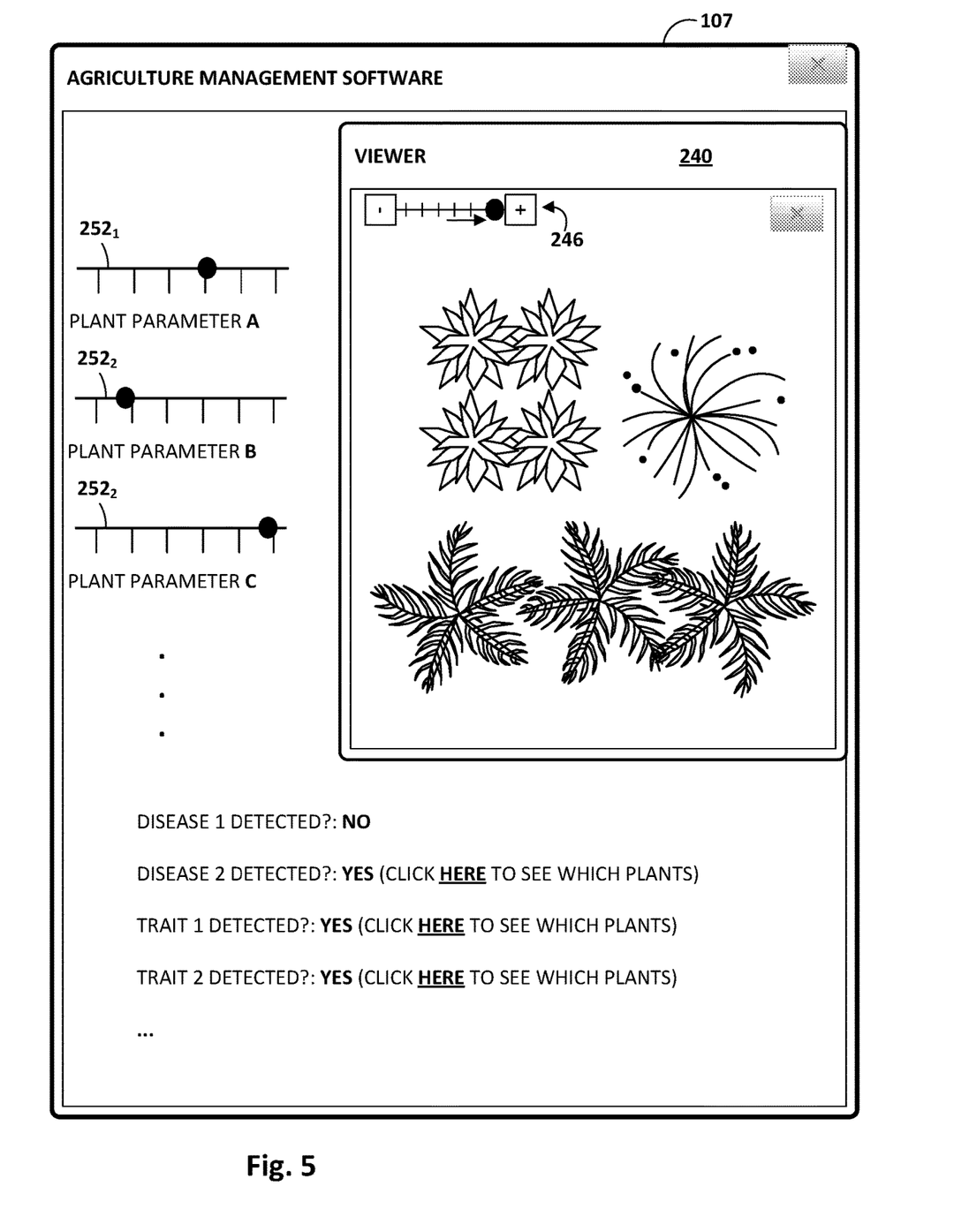
FIG. 5 schematically depicts the GUI of FIGS. 1-3 in yet another state.

In some implementations, the user may be able to zoom in even more to view individual plants. For example, a breeder may wish to analyze individual plants for purposes such as phenotyping. According, and as shown in FIG. 5, the user may operate zoom slider 246 further to zoom into a close-up view of one or more individual plants. In this example, some statistics are provided at bottom related to whether particular plant diseases are detected in these plants, and/or whether various genetic traits are detected in these plants (e.g., via phenotyping techniques). The parameter adjustment elements $252_{1-3}$ at left are also changed to adjust parameters related to individual plants.

Figure 6:
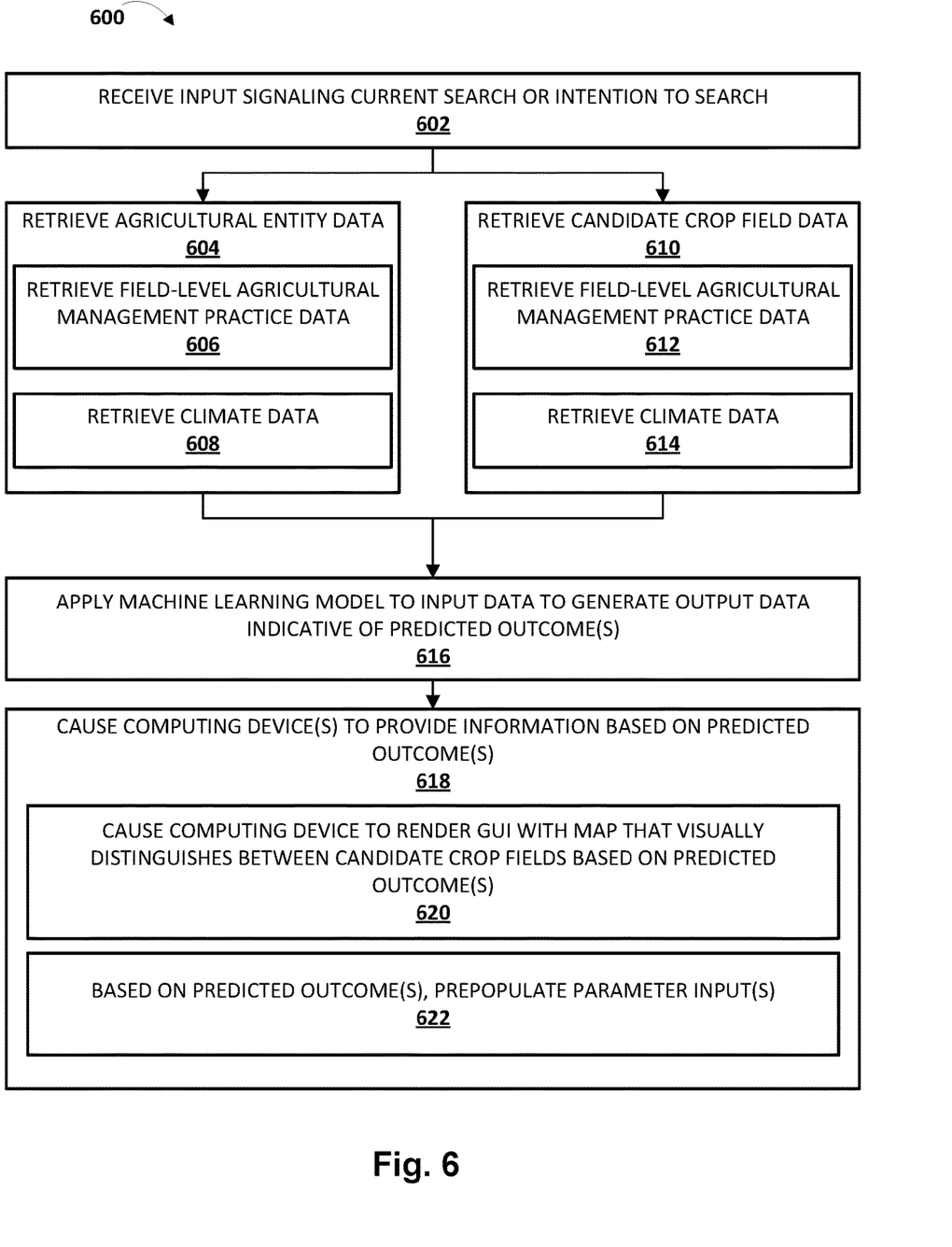
FIG. 6 is a flowchart of an example method in accordance with various implementations described herein.

FIG. 6 illustrates a flowchart of an example method 600 for practicing selected aspects of the present disclosure. The operations of FIG. 6 can be performed by one or more processors, such as one or more processors of the various computing devices/systems described herein, such as by farmland knowledge system 104. For convenience, operations of method 600 will be described as being performed by a system configured with selected aspects of the present disclosure, such as farmland knowledge system 104. Other implementations may include additional operations than those illustrated in FIG. 6, may perform step(s) of FIG. 6 in a different order and/or in parallel, and/or may omit one or more of the operations of FIG. 6.

At block 602, the system may receive input, e.g., via a GUI provided by AMS 107, signaling that a user is currently searching or intends to search for farmland. For example, the user may launch AMS 107, or may navigate to a crop field search interface of AMS 107 (examples depicted in FIGS. 2-3), and/or may adjust one or more parameters of a crop field search. In some implementations, this input may trigger implementation of the downstream operations of method 600.

At block 604, the system may retrieve agricultural entity data associated with the agricultural entity with which the user operated AMS 107 is affiliated, e.g., as an employee, contractor, volunteer, member, shareholder, executive, etc. For example, at block 606, the system, e.g., by way of agricultural management module 122, may retrieve, e.g., from database 130, field-level agricultural management practice data of the agricultural entity. At block 608, the system may, e.g., by way of climate module 120, may retrieve, e.g., from climate database 128, climate data associated with farmland current and/or historically managed by the agricultural entity. Collectively, the data retrieved at blocks 606-608 may provide a snapshot or fingerprint indicative of the agricultural entity's capabilities, achievements, strengths, weaknesses, etc.

Similar to block 604, at block 610, the system may retrieve candidate crop field data associated with one or more candidate crop fields that are not currently managed by the agricultural entity and/or are eligible for management by the agricultural entity. These candidate crop fields may be initially identified (e.g., for further consideration) based on various signals, such as proximities to crop fields already managed by the agricultural entity, proximity to a headquarters of the agricultural entity, presence in an overhead view of software operated by agricultural entity personnel (e.g., viewer 240), one or more high-level parameters provided by the user (e.g., general region/state/county, targeted crop type, etc.), and so forth.

At block 612 (similar to block 606), the system, e.g., by way of agricultural management module 122, may retrieve, e.g., from database 130, field-level agricultural management practice data of one or more other agricultural entities that currently manage and/or historically have managed the candidate crop fields. At block 614 (similar to block 608), the system may, e.g., by way of climate module 120, may retrieve, e.g., from climate database 128, climate data associated with the one or more candidate crop fields.

At block 616, the system may, e.g., by way of inference module 124, may apply a machine learning model to the input data to generate output data. As noted previously, the input data may include a first plurality of data points corresponding to field-level agricultural management practices of an agricultural entity obtained at block 606. The input data may additionally or alternatively include the climate data retrieved at blocks 608 and/or 614, and/or the field-level agricultural management data retrieved at block 612. The output data generated at block 616 may be indicative of one or more predicted outcomes of the agricultural entity implementing the field-level agricultural management practices on one or more candidate crop fields not currently managed by the agricultural entity.

Based on one or more of the predicted outcomes, at block 618, the system, e.g., by way of UI module 126, may cause one or more computing devices (e.g., $106_{1-N}$) to provide a user associated with the agricultural entity with information about one or more of the candidate crop fields. This information may include, for instance, visual annotations of the one or more candidate crop fields in a GUI of AMS 107, statistics about the predicted outcome(s) presented in other interfaces, etc. For example, at block 620, UI module 126 may cause a computing device to render a GUI such as that depicted in FIGS. 2-5. The GUI may include a map that visually distinguishes between candidate crop fields based on the predicted outcome(s). For example, in FIGS. 2-3, some crop fields were visually annotated with shading to indicate that those fields were compatible with an agricultural entity's field-level agricultural management practices. Additionally or alternatively, in some implementations, at block 622, UI module 126 may, based on one or more of the predicted outcomes, prepopulate one or more parameter inputs, such as one or more parameter adjustment elements 242.

Figure 7:
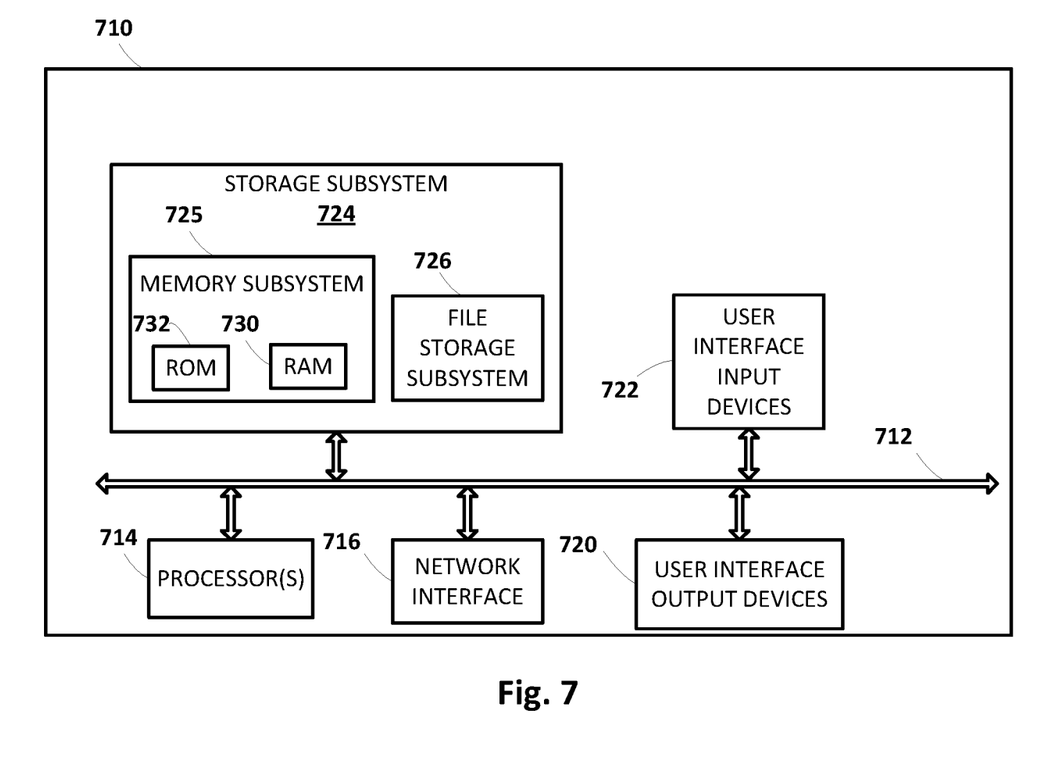
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 710 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of method 600 described herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for identifying crop fields suitable for management by an agricultural entity, the method implemented using one or more processors and comprising:
    a machine learning model to input data to generate output data,
    wherein the input data includes:
        a first plurality of data points indicative of a first plurality of field-level agricultural management practices implemented historically by the agricultural entity in one or more crop fields managed by the agricultural entity,
        one or more additional pluralities of data points indicative of one or more additional pluralities of field-level management practices implemented historically by one or more other agricultural entities in one or more candidate crop fields not currently managed by the agricultural entity, and
    wherein the output data is indicative of one or more predicted outcomes of the agricultural entity implementing the first plurality of field-level agricultural management practices on one or more candidate crop fields not currently managed by the agricultural entity;

causing one or more computing devices to render a field searching graphical user interface, wherein the field searching graphical user interface includes a plurality of graphical search parameter inputs that are operable by a user to control how a map is rendered by the field searching graphical user interface, wherein the graphical search parameter inputs comprise one or more of a slider, a radio button, a text input, or a checkbox;

based on one or more of the predicted outcomes, causing one or more at least some of the graphical search parameter inputs of the field searching graphical user interface to be automatically populated with one or more of the field-level agricultural management practices implemented historically by the agricultural entity or one or more of the field-level management practices implemented historically by one or more of the other agricultural entities; and causing the map to be rendered with one or more visual annotations of one or more of the candidate crop fields in accordance with the automatically populated graphical search parameter inputs, wherein the one or more visual annotations visually distinguish one or more candidate crop deemed suitable for management by the agricultural entity based on one or more of the predicted outcomes from one or more others of the candidate crop fields that are deemed unsuitable for management by the agricultural entity based on one or more of the predicted outcomes.

2. The method of claim 1, wherein parameters selected to auto-populate the one or more graphical search parameter inputs comprise parameters shared amongst at least some of the one or more additional pluralities of field-level management practices implemented in the one or more candidate crop fields not currently managed by the agricultural entity.

3. The method of claim 2, wherein the shared parameters are selected from one or more of the additional pluralities of field-level management practices that yielded positive predicted outcomes.

4. The method of claim 1, wherein the one or more visual annotations include one or more of the candidate crop fields that are deemed suitable for management by the agricultural entity having a first color or fill, and one or more others of the candidate crop fields that are deemed unsuitable for management by the agricultural entity having a second color or fill that is different from the first color or fill.

5. The method of claim 1, wherein the machine learning model is trained by comparing predicted outcomes, generated using the machine learning model based on historical data associated with crop fields, with ground truth outcomes that were achieved in the crop fields associated with the historical data.

6. The method of claim 1, wherein the applying is performed in response to receipt of input signaling that the user intends to search or is searching for candidate crop fields to be managed by the agricultural entity.

7. The method of claim 1, wherein one or more of the candidate crop fields that are deemed suitable for management by the agricultural entity are identified based on a threshold distance in latent space between an embedding generated based at least in part on the field-level agricultural management practices of the agricultural entity and one or more embeddings generated based on one or more of the candidate crop fields.

8. The method of claim 7, wherein one or more of the candidate crop fields that are deemed suitable for management by the agricultural entity are identified further based on a crop yield threshold or a profit margin threshold.

9. A system for identifying crop fields suitable for management by an agricultural entity, the system comprising one or more processors and memory storing instructions that, in response to execution of the instructions, cause the one or more processors to:

apply a machine learning model to input data to generate output data, wherein the input data includes:
a first plurality of data points indicative of a first plurality of field-level agricultural management practices implemented historically by the agricultural entity in one or more crop fields managed by the agricultural entity,
one or more additional pluralities of data points indicative of one or more additional pluralities of field-level management practices implemented historically by one or more other agricultural entities in one or more candidate crop fields not currently managed by the agricultural entity, and wherein the output data is indicative of one or more predicted outcomes of the agricultural entity implementing the first plurality of field-level agricultural management practices on one or more candidate crop fields not currently managed by the agricultural entity;

cause one or more computing devices to render a field searching graphical user interface, wherein the field searching graphical user interface includes a plurality of graphical search parameter inputs that are operable by a user to control how a map is rendered by the field searching graphical user interface, wherein the graphical search parameter inputs comprise one or more of a slider, a radio button, a text input, or a checkbox;

based on one or more of the predicted outcomes, cause at least some of the graphical search parameter inputs of the field searching graphical user interface to be automatically populated with one or more of the field-level agricultural management practices implemented historically by the agricultural entity or one or more of the field-level management practices implemented historically by one or more of the other agricultural entities; and cause the map to be rendered with one or more visual annotations of one or more of the candidate crop fields in accordance with the automatically populated graphical search parameter inputs, wherein the one or more visual annotations visually distinguish one or more candidate crop deemed suitable for management by the agricultural entity based on one or more of the predicted outcomes from one or more others of the candidate crop fields that are deemed unsuitable for management by the agricultural entity based on one or more of the predicted outcomes.

10. The system of claim 9, wherein parameters selected to auto-populate the one or more graphical search parameter inputs comprise parameters shared amongst at least some of the one or more additional pluralities of field-level management practices implemented in the one or more candidate crop fields not currently managed by the agricultural entity.

11. The system of claim 10, wherein the shared parameters are selected from one or more of the additional pluralities of field-level management practices that yielded positive predicted outcomes.

12. The system of claim 10, wherein the one or more visual annotations include one or more of the candidate crop fields that are deemed suitable for management by the agricultural entity having a first color or fill, and one or more others of the candidate crop fields that are deemed unsuitable for management by the agricultural entity having a second color or fill that is different from the first color or fill.

13. The system of claim 9, wherein the machine learning model is trained by comparing predicted outcomes, generated using the machine learning model based on historical data associated with crop fields, with ground truth outcomes that were achieved in the crop fields associated with the historical data.

14. The system of claim 9, wherein the applying is performed in response to receipt of input signaling that the user intends to search or is searching for candidate crop fields to be managed by the agricultural entity.

15. The system of claim 9, wherein one or more of the candidate crop fields that are deemed suitable for management by the agricultural entity are identified based on a threshold distance in latent space between an embedding generated based at least in part on the field-level agricultural management practices of the agricultural entity and one or more embeddings generated based on one or more of the candidate crop fields.

16. The system of claim 15, wherein one or more of the candidate crop fields that are deemed suitable for management by the agricultural entity are identified further based on a crop yield threshold or a profit margin threshold.

17. A non-transitory computer-readable medium for identifying crop fields suitable for management by an agricultural entity, the medium comprising instructions that, in response to execution of the instructions by a processor, cause the processor to:
apply a machine learning model to input data to generate output data,
wherein the input data includes:
a first plurality of data points indicative of a first plurality of field-level agricultural management practices implemented historically by the agricultural entity in one or more crop fields managed by the agricultural entity,
one or more additional pluralities of data points indicative of one or more additional pluralities of field-level management practices implemented historically by one or more other agricultural entities in one or more candidate crop fields not currently managed by the agricultural entity, and
wherein the output data is indicative of one or more predicted outcomes of the agricultural entity implementing the first plurality of field-level agricultural management practices on one or more candidate crop fields not currently managed by the agricultural entity;
cause one or more computing devices to render a field searching graphical user interface, wherein the field searching graphical user interface includes a plurality of graphical search parameter inputs that are operable by a user to control how a map is rendered by the field searching graphical user interface, wherein the graphical search parameter inputs comprise one or more of a slider, a radio button, a text input, or a checkbox;
based on at least some of the graphical search parameter inputs of the field searching graphical user interface to be automatically populated with one or more of the field-level agricultural management practices implemented historically by the agricultural entity or one or more of the field-level management practices implemented historically by one or more of the other agricultural entities; and
causing the map to be rendered with one or more visual annotations of one or more of the candidate crop fields in accordance with the automatically populated graphical search parameter inputs, wherein the one or more visual annotations visually distinguish one or more candidate crop deemed suitable for management by the agricultural entity based on one or more of the predicted outcomes from one or more others of the candidate crop fields that are deemed unsuitable for management by the agricultural entity based on one or more of the predicted outcomes.

18. The non-transitory computer-readable medium of claim 17, wherein parameters selected to auto-populate the one or more graphical search parameter inputs comprise parameters shared amongst at least some of the one or more additional pluralities of field-level management practices implemented in the one or more candidate crop fields not currently managed by the agricultural entity.

\* \* \* \* \*